| United States Patent [19] | [11] Patent Number: 4,943,306 |
| Cho | [45] Date of Patent: Jul. 24, 1990 |

[54] EXHAUST GAS PURIFYING SYSTEM

[76] Inventor: Ching-Chi Cho, No. 3, Lane 6, Ta-Chiao 2nd Street, Yung kang Hsiang, Tainan Hsien, Taiwan

[21] Appl. No.: 398,497

[22] Filed: Aug. 25, 1989

[51] Int. Cl.$^5$ .............................................. B01D 47/00
[52] U.S. Cl. ......................................... 44/228; 55/233
[58] Field of Search .................................. 55/228, 233

[56] References Cited

U.S. PATENT DOCUMENTS 2,858,903 11/1958 Goetz et al. ............................ 55/89
3,811,247 5/1974 Huppke .................................. 55/223

Primary Examiner—Bernard Nozick
Attorney, Agent, or Firm—Morton J. Rosenberg; David I. Klein

[57] ABSTRACT

This invention relates to an exhaust gas purifying system for diminishing air pollution essentially comprising to purifying devices side by side in sequential combination. The purifying device comprises a casing formed with a water or liquid chemical tank having deposit collecting means and means for draining deposits and a chamber over the tank forming a downward passage fitted with strainer and a spray duct positioned in the chamber and over the strainers and having a number of nozzles directing downwardly and means for supplying clean water or liquid chemical from the tank to the spray duct, whereby exhaust gases led into this device will flow along the passage and through the strainers and purified by tiny dropped water or liquid chemical from the spray duct.

1 Claim, 2 Drawing Sheets

EXHAUST GAS PURIFYING SYSTEM

BACKGROUND OF THE INVENTION

This invention relates to a purifier, and particularly to an exhaust gas purifying system for diminishing air pollution.

Nowaday, many industrial equipments such as burner boiler or ventilator may produce exhaust gases with harmful or poisonous contents such as carbon monoxide, nitrogen dioxide, sulphates and particles of waste which cause serious air pollutions to the environment including the working field. To this end, the inventor has attempted to make an exhaust gas purifying system for said industrial equipments to diminish the air pollutions therewith.

OBJECT OF THE INVENTION

It is therefore an object of this invention to provide an exhaust gas purifying system for purifying exhaust gases of burning or ventilating devices.

DETAILED DESCRIPTION OF PREFERRED EMBODIMENT

Figure 1:
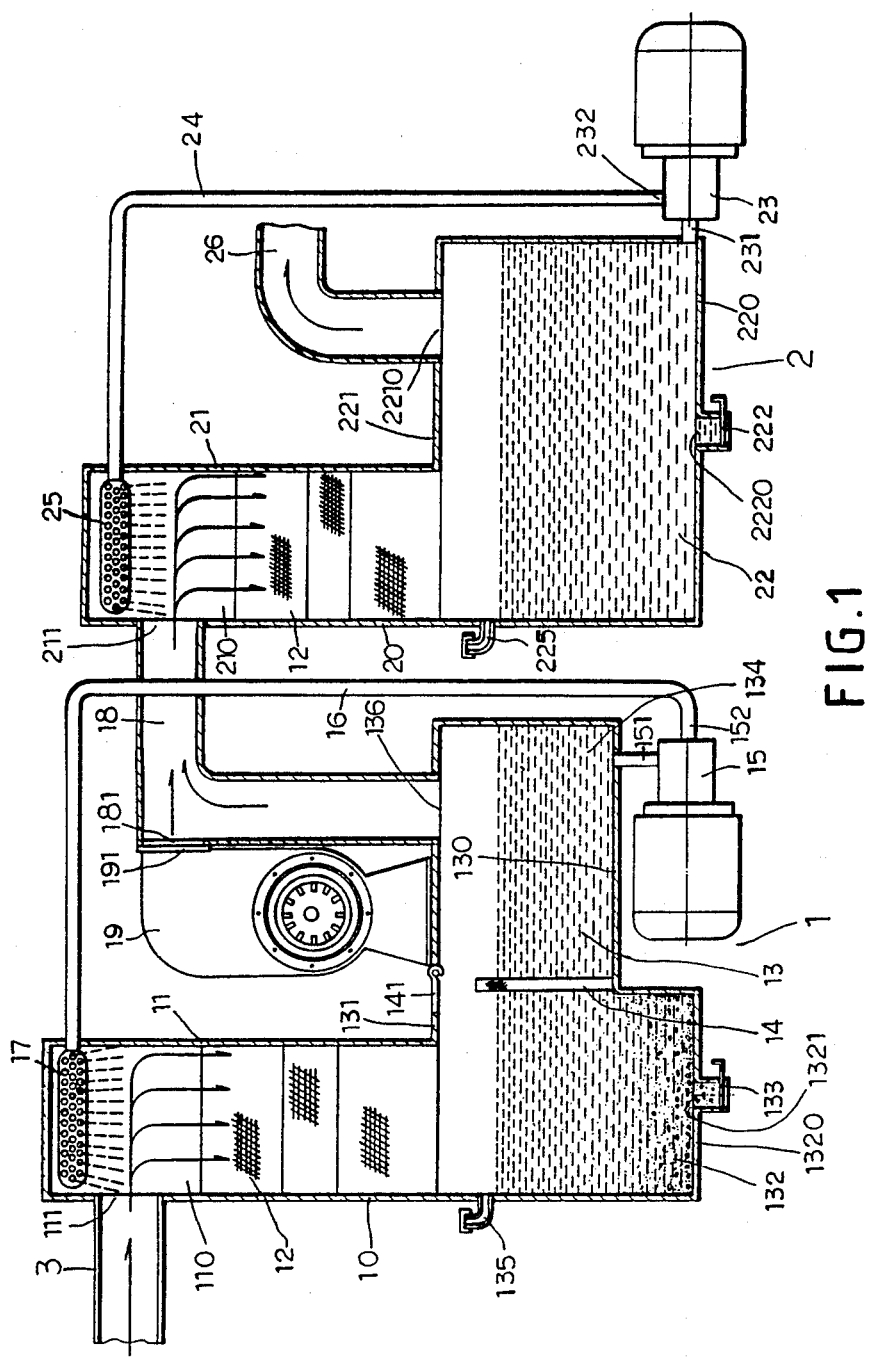
FIG. 1 is a cross-sectional view of a preferred embodiment according to this invention.

As shown in FIG. 1, an exhaust gas purifying system essentially comprises a first purifier generally indicated by numeral 1 and a second purifier generally indicated by numeral 2 side by side in combination.

The first purifier 1 includes a casing 10 integrally formed with a water tank 13, which is divided into a deposit compartment 132 having a bottom 1320 extending downwardly from a bottom 130 thereof and a water compartment 134 by means of a partition strainer 14 up-raised from the bottom 130, and a cylindrical strainer housing 11 mounted over a frontward open portion of a plane top 131, having an inlet port 111 in an upper portion and vertically in alignment with the deposit compartment 132 of the water tank 13. The bottom 1320 of the deposit compartment 132 is formed with a drain hole 1321 closed and sealed with a lid 133 which is adapted to open to drain deposits. The top 131 of the water tank 13 is formed with a hank-hole adjacent the strainer housing 11 and adapted to be closed with a lid 141 for clean or repairment of the strainers 12 in the passage 110 of the housing 11.

Figure 2:
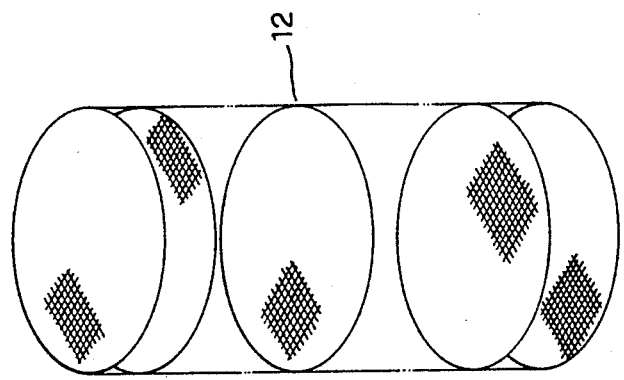
FIG. 2 is a perspective view of the strainers used in this invention.

The strainer housing 11 provides a downward passage 110 for exhaust gases leading from a funnel or exhaust pipe (not shown) of said burning or ventilating devices through an air conduit 3. A plurality of layers of strainers 12 (see FIG. 2) are fitted in a portion below the inlet port 111 and across the passage 110 of the strainer housing 11.

The water tank 13 is further provided with a water inlet joint 135 mounted on an upper portion of the side wall thereof for filling clear water into the tank 13 and a discharge port 136 in a rearward portion of the top 131.

A water pump 15 has a suction end 151 connected to the bottom 130 of the tank 13 and a discharge end 152 connected with an end of a water pipe 16. The water pipe 16 extends upwardly and has the other end terminated with a spray duct 17 transversely positioned in the strainer housing 11 above the inlet port 111 and having a plurality of spray nozzles substantially directed downwardly.

The construction of the second purifier 2 is similar to that of the first purifier 1. The second purifier 2 includes a casing 20 integrally formed with a water tank 22 and a cylindrical strainer housing 21 mounted over a frontward open portion of a plane top 221 and having an inlet port 211 in an upper portion.

The inlet port 211 of the second strainer housing 21 is connected to the discharge port 136 of the water tank 13 through an air conduit 18. The air conduit 18 is formed with an opening 181 correspondingly connected to a discharge end 191 of an air blower 19 for mixing fresh air into the discharge air from the first purifier 1.

The second strainer housing 21 also provides a downward passage 210 for exhaust gases leading from the first purifier 1 through the air conduit 18. A plurality of layers of strainers 12 are fitted in a portion below the inlet port 211 and across the passage 210 of the strainer housing 21.

The second water tank 22 is further provided with a water inlet joint 225 mounted on an upper portion of the side wall thereof for filling clean water or liquid chemical capable for diminishing poison of the gas into tank 22, a drain hole 2220 in a bottom 220 thereof and adapted to be closed and sealed with a lid 222 which is adapted to open to drain deposits, and a discharge port 2210 in a rearward portion of the top 131. A discharge pipe 26 leading to an open air is connected to the discharge port 2210.

A water pump 23 has a suction end 231 connected to the bottom 220 of the second water tank 22 and a discharge end 232 connected with an end of a water pipe 24. The water pipe 24 extends upwardly and has the other end terminated with a second spray duct 25 transversely positioned in the second strainer housing 21 above the inlet port 211 and having a plurality of spray nozzles substantially directed downwardly.

In operation, the exhaust gases will firstly pass through the strainers 12 in the passage 110 and thus slow down in flow speed as to be mixed with tiny dropped water from the spray duct 17 and forced through the strainers 12. The residuals filtered from the exhaust gases will gradually drop into the deposit compartment 132 and deposit on the bottom 1320 thereof.

The exhaust gases thus threated will further discharge through the port 136 into the conduit 18, mix with fresh air being fed into the conduit 18 through the opening 181 by means of the air blower 19 and be forced into the second strainer housing 21. The purifying treatment in the second housing 21 is almost the same as the treatment in the first strainer housing 11. The residuals in the strainers 12 will also gradually drop into the second water tank 22 and deposit on the bottom 220 thereof. The exhaust gases thus purified, for the second time, will discharge into an open air through the pipe 26.

The deposits collected on the bottoms 1320, 220 of the deposit compartment 132 and the second water tank 22 can be periodically drained off by respectively opening the lids 133, 222, and clean water can be fed into the first and the second water tanks 13, 22 through respective joints 135, 225 when necessary.

The preferred embodiment of this invention resides in the following features:

(1) Since the exhaust gases are purified, the working field can maintain clean and the air pollutions to the environment can thus be diminished;

(2) The preferred embodiment of this invention is simple in construction, economical in manufacture and thus suitable for being used in a small factory;

(3) It is adaptable for filtering different kinds of exhaust gases simply by replacing suitable scale of the strainers.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An exhaust gas purifying system comprising a first and a second purifiers side by side in combination, the first purifier including a casing integrally formed with a water tank, having a perforated top and being divided into a first compartment having a bottom and a second compartment having a bottom extending downwardly from the bottom of the first compartment by means of a vertical strainer means and a chamber corresponding to an opening in the top, extending upwardly from the top and forming a vertical passage along the chamber downwardly in alignment with the first compartment, strainer means fitted in the chamber across the passage, means for leading exhaust gases into the chamber to flow along the passage through the strainer means, means for feeding clean water into the water tank, water spray means in the chamber over the strainer means for spraying water downwardly along the passage, means for supplying water from the water tank to the water spray means, means provided in the bottom of the first compartment for draining and means in the top of the water tank for discharging the exhaust gases;

the second purifier including a casing integrally formed with a second water tank, having a perforated top and bottom, and a second chamber corresponding to an opening in the top, extending upwardly from the top and forming a vertical passage along the second chamber, a second strainer means fitted in the second chamber across the passage thereof, means for leading exhaust gases from the first purifier into the second chamber to flow along the passage thereof though the second strainer means, means for feeding clean water or liquid chemical into the second water tank, a second water spray means in the second chamber over the second strainer means for spraying water or liquid chemical downwardly along the passage in the second chamber, means for supplying the water from the second water tank to the second water spray means, means provided in the bottom of the second water tank for draining and means in the top of the second water tank for discharging the exhaust gases into an open air; and a blower means for feeding fresh air in mixture with the exhaust gases from the first purifier into the second purifier.

* * * * *